Figure 1:
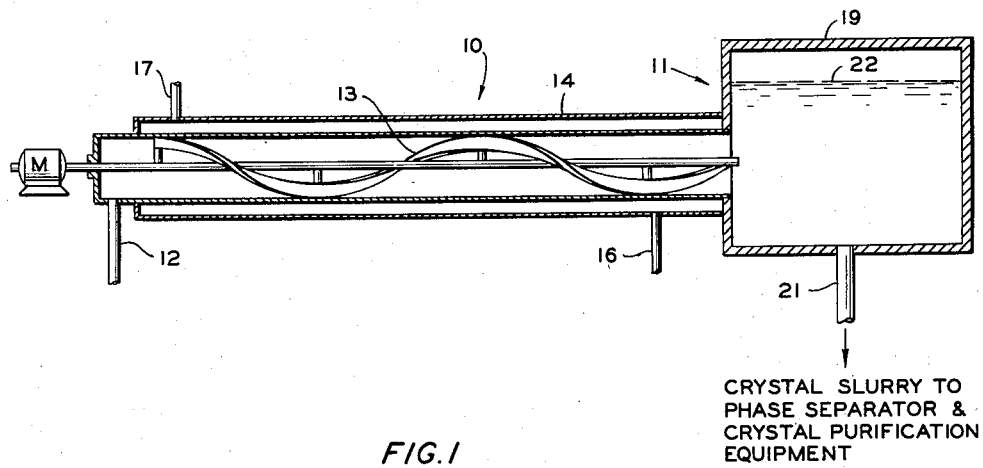

Aug. 19, 1958     R. M. GREEN     2,848,516

CRYSTAL PURIFICATION METHOD

Filed March 16, 1953

CRYSTAL SLURRY TO PHASE SEPARATOR & CRYSTAL PURIFICATION EQUIPMENT

INVENTOR.
R. M. GREEN

BY *Hudson and Young*

ATTORNEYS

_United States Patent Office_

2,848,516
Patented Aug. 19, 1958

2,848,516

CRYSTAL PURIFICATION METHOD

Richard M. Green, Borger, Tex., assignor to Phillips Petroleum Company, a corporation of Delaware Application March 16, 1953, Serial No. 342,423

4 Claims. (Cl. 260—674)

This invention relates to the separation of materials utilizing partial solidification separation processes. In a further aspect this invention relates to a method for preparing the partially solidified feed slurry before introducing it into the separation apparatus. In a further aspect this invention relates to a method of crystal preparation, in which, in addition to a primary crystalline product, a secondary crystalline product is also formed, the heat of fusion of this secondary crystalline product being utilized to maintain a desired temperature in a soaking zone.

Crystal purification by fractional crystallization and fractional melting has become widely used as a method of separating materials which are difficult to separate by prior methods such as by fractional distillation and solvent extraction. The method has special value where boiling points are close together. Furthermore, these prior methods involve a series of operations in order to obtain products of high purity whereas, in many cases, fractional crystallization produces materials of high purity in a single operation.

In the crystal preparation it is usual operation to introduce the feed material into a chiller in which a portion of the material is crystallized. From this chiller the material is conveyed to a soaking zone where it is held for a period of time. In the soaking zone the crystals attain a size suitable for future operations, these comprising phase separation and crystal purification. Various types of crystal purification equipment are suitable for use in combination with the method of the present invention. As representative types, there may be mentioned the apparatus disclosed in Weedman application Serial No. 166,992, filed June 9, 1950, now Patent 2,747,001; Green apparatus disclosed in application Serial No. 327,380, filed December 22, 1952, now Patent 2,765,921, this apparatus being an improvement upon the Weedman apparatus; and the apparatus of D. L. McKay, disclosed in application Serial No. 375,850, filed August 24, 1953.

Each of the following objects is attained by at least one of the aspects of this invention.

An object of this invention is to provide a method for improved operation of partial solidification separation processes. A further object of this invention is to provide a method of crystal slurry preparation for use in these processes. A further object of this invention is to provide a method of crystal production in which, in addition to a primary crystalline product, a secondary crystalline product is formed in a chilling zone before the material is introduced into a soaking zone and the heat of fusion of said secondary crystallization material is utilized to maintain the desired temperature in the soaking zone. A further object of this invention is to provide a method of recovering para-xylene from a feed stream containing this material. A further object of this invention is to provide a method for the concentration of food products.

Other objects and advantages will be apparent to one reading the accompanying disclosure.

Figure 2:
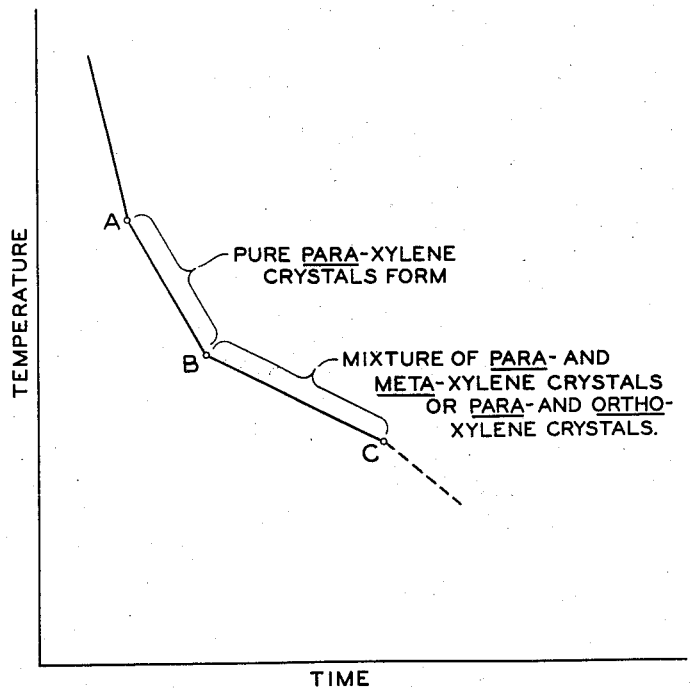

Accompanying and forming a part of this disclosure is a drawing comprising:

Figure 1, showing a sectional view of apparatus used in the process of this invention, and Figure 2, which is a time-temperature curve for a particular system which may be employed in the practice of this invention.

I have invented a method by which the heat of fusion of a second solid product may be utilized to maintain reduced temperature while handling a mixture of primary and secondary solid products in any process involving purification by crystallization. In the usual operation for such systems the material is chilled only to a point where a primary solid product is present. The resulting slurry is then conveyed to a slurry holding or soaking zone. Such a zone provides means for providing material as needed to the separation equipment and permits growth of crystals. In prior operation it has been necessary to provide additional refrigeration for said soaking zone. This refrigeration is necessary because of heat leak into the system and the heat introduced as a result of agitation of this slurry. According to my invention, an insulated tank is used and the feed material is cooled to a temperature below that at which all of the primary solid material will be formed. The heat which is introduced into the soaking zone melts the secondary solid material or at least a portion of this secondary solid material. Thus, none of the desired primary solid material is lost to the liquid phase and it is possible to operate the system at maximum efficiency. In other words, the system may absorb a certain amount of heat without loss of the desired product before washing.

Separation apparatus of the type described in the above identified disclosures has found its greatest applicability in dealing with systems which form crystalline solids.

Directing attention to Figure 1, apparatus for carrying out this invention is shown. This apparatus comprises a chiller indicated at 10 and a holding or soaking zone indicated at 11. The feed stream is introduced through conduit 12 into the central section of the scraped surface chiller 10, this chiller being provided with a scraper 13 and refrigerant zone 14. Refrigerant is introduced into zone 14 through conduit 16 and removed therefrom through conduit 17. Soaking zone 11 is a large tank in which the solid material may be stored. Surrounding tank 11 there is provided insulation 19. Extending from the lower portion of tank 11 is a conduit 21, this conduit extending to the separation equipment, such latter apparatus not being shown. In this figure the level of the slurry in the tank is indicated at level 22.

Figure 2 is a simplified showing of a time-temperature curve illustrating the types of crystalline material which form in a particular system which may be treated by my method, this being a commercial xylene mixture. Cooling to a temperature A merely reduces the temperature of the liquid material. In the range AB pure para-xylene crystals form. At point B a temperature is reached at which a binary eutectic forms, this being a mixture of para- and meta-xylene crystals, or a mixture of para- and ortho-xylene crystals, depending upon the feed composition. As the temperature is lowered in the range BC it is this binary eutectic which crystallizes, and this continues until point C at which a ternary eutectic begins to form. The particular temperatures at these points A, B and C are dependent upon the composition of the particular feed being treated.

_Example_

As a specific example, the recovery of pure para-xylene from a commercial grade xylene is described, but it will be understood that this is merely one isolated feed that could be treated by the method of the present invention.

Such a commercial mixture contains para-, meta-, and ortho-xylene with ethyl benzene, toluene, and other paraffinic and aromatic constituents in small amounts. For this particular feed stream, the temperature at point A is —90.9° F. and that at point B is —99.9° F. In dealwith such a system, as pointed out above, the prior practice would be to cool this system only to —99.9° F. or a point very slightly above this temperature, to eliminate the possibility of the formation of any of the binary eutectic mixture. According to my method the chiller is operated to cool the mixture to a point below this temperature, the exact temperature to which this cooling is extended being dependent upon various factors. The first, and probably most important factor, is the amount of insulation which is present upon any particular soak tank. Another variable is the temperature outside of the soak tank. From these figures and the maximum temperature which it is desired to maintain in this soak tank, the heat leak into the tank can be calculated.

Knowing the heat leak into the tank, the heats of fusion of the crystalline materials, and the average sensible heat change in the liquid phase, it is possible to calculate the amount of the secondary crystalline material, the binary eutectic in this case, that should be formed in order to compensate for the heat leak. For instance, assuming the —90.9° F. presented above, and an outside temperature of 90° F. a particular tank has been found to have a heat leak of approximately 930 B. t. u. per hour. Then, assuming a feed of 100 pounds an hour containing 19.7 weight per cent para-xylene and 46.1 weight percent meta-xylene, it can be shown, by calculating the heat balance, that it will be necessary to crystallize approximately all of the binary eutectic at —99.9° F. in order to compensate for the 930 B. t. u. per hour heat leak into the system, and hold the soak tank at approximately —90.9° F.

Utilizing such a method it will be seen that the apparatus can be considerably simplified. First, no separate refrigeration system is needed for the soak tank and, second, the wall scraper in the soak tank can be eliminated. However, it is desired to point out that in most installations it would be desirable to provide some form of agitation for this tank so that the material therein will be of uniform composition. This is due to the fact that the temperature will be highest near the outer surface of the tank and least in the central portion which, without agitation, would result in nonuniform melting. If apparatus such as that disclosed in the above mentioned disclosures is used, it is not necessary to provide an exact balance between the amount of secondary solid material formed to that which is needed to just maintain all of the primary solid material in the solid state. In other words the efficiency of the apparatus disclosed in those applications is not reduced if a small amount of secondary solid material is introduced into the purification column.

It will be obvious to one skilled in the art that additional valves, controls, and other supplementary equipment would be utilized in the practicing of the processes of this invention, but such elements have been eliminated for the purpose of simplicity in this disclosure.

This invention may be applied to a vast number of organic and inorganic separations. Representative organic systems are recited in the Weedman disclosure, and of principal importance, there may be mentioned separation of systems containing xylenes, systems containing cyclohexane, systems containing normal paraffins, systems containing benzene, and the like. Other organic chemicals that may be mentioned include pyridines, dimethylphthalates, and fatty acids. Synthetic resins, such as polyethylene, can be purified in this manner. Applicable inorganic systems are those for the recovery of pure salts, such as ammonium nitrate for example. Another group is the recovery of anhydrous salts from their hydrates.

An important field in which the present invention is applicable, is the production of concentrated food products, consisting principally of the removal of water from these products. Water can be removed from fruit juices such as grape, pineapple, watermelon, apple, and tomato. Vegetable juices can also be dehydrated in this manner.

Also important is the beverage field where transportation costs add greatly to the cost of these materials by the time they are brought to the hands of the consumer. Beverages which may be concentrated by this method include milk, alcoholic beverages such as beer and wine, and coffee and tea.

Finally, there may be mentioned the purification and concentration of pharmaceuticals, these materials also being readily adaptable to treatment in partial solidification or crystallization processes.

As many possible embodiments may be made of this invention without departing from the scope thereof, it is to be understood that all matter herein set forth or shown in the accompanying drawing is to be interpreted as illustrative and not in a limiting sense.

I claim:

1. In a separation of materials which form primary and secondary solids by partial solidification processes in which the feed material is cooled to form a slurry and said slurry is held in a holding zone prior to further treatment, the improvement which comprises determining heat leak into the holding system during the desired holding time, crystallizing secondary solid material in an amount substantially equal to that which will be melted by heat leak into the holding zone, and withdrawing for said further treatment a slurry containing said primary solids substantially free of secondary solids.

2. In the separation of materials which form primary and secondary crystals by fractional crystallization processes in which the feed material is cooled to form a crystal slurry and said slurry is held in a holding zone prior to further treatment, the improvement which comprises determining heat leak into said holding zone during the desired holding time, crystallizing secondary crystalline material in an amount substantially equal to that which will be melted by heat leak into the holding zone, and withdrawing crystal slurry from said zone substantially free of said secondary crystals.

3. In the process of recovering para-xylene from a feed containing same in admixture with other xylenes, and wherein a crystal holding zone is used, the steps which comprise determining heat leak into said holding zone, chilling said mixture to crystallize the para-xylene, further chilling said mixture to crystallize material comprising a mixture selected from the group consisting of para- and meta-xylenes and para- and ortho-xylenes in an amount substantially equal to that which will be melted by heat leak into the holding zone, holding said slurry in said holding zone to permit growth of crystals, maintaining all the para-xylene in the crystalline state by melting crystals selected from the group consisting of para- and meta-xylene and para- and ortho-xylene, and withdrawing a slurry containing the xylene crystals, said slurry being substantially free of crystals selected from the group consisting of para- and meta-xylene and para- and ortho-xylene.

4. In the process of recovering para-xylene from a feed containing same in admixture with other xylenes, the steps which comprise chilling said mixture to crystallize the para-xylene, further chilling said mixture to crystallize material selected from the groups consisting of para- and meta-xylenes and para- and ortho-xylenes, holding the crystalline material in a soak tank to permit growth of crystals, maintaining all para-xylene in the crystalline state by melting said mixture selected from the group consisting of para- and meta-xylene and para- and ortho-xylene to compensate for heat leak into the system.

References Cited in the file of this patent

UNITED STATES PATENTS

| | | |
|---|---|---|
| 1,835,271 | Burke et al. | Dec. 8, 1931 |
| 2,541,682 | Arnold | Feb. 13, 1951 |
| 2,637,749 | Aston et al. | May 5, 1953 |
| 2,651,655 | Booker | Sept. 8, 1953 |
| 2,665,316 | Bennett | Jan. 5, 1954 |
| 2,688,045 | Powers et al. | Aug. 31, 1954 |

OTHER REFERENCES

Riegel: "Chemical Machinery," Reinhold Publishing Co., 330 W. 42nd Street, New York, N. Y., page 343.

Lange: Handbook of Chemistry, 6th ed. (1946), Handbook Publishers, Sandusky, Ohio, page 1514.